US012633274B1

(12) United States Patent
Mcbride et al.

(10) Patent No.: US 12,633,274 B1
(45) Date of Patent: May 19, 2026

(54) SPRING CUSHIONED CLAMP CAPO

(71) Applicants: Cole Eshee Heve Mcbride, Victoria (CA); Andres Somasco, Nelson (CA)

(72) Inventors: Cole Eshee Heve Mcbride, Victoria (CA); Andres Somasco, Nelson (CA)

(73) Assignee: Black Mountain Designs LTD., Nelson (CA)

( * ) Notice: Subject to any disclaimer, the term of this patent is extended or adjusted under 35 U.S.C. 154(b) by 0 days.

(21) Appl. No.: 19/374,130

(22) Filed: Oct. 30, 2025

(51) Int. Cl.
*G10D 3/053* (2020.01)

(52) U.S. Cl.
CPC .................................... *G10D 3/053* (2020.02)

(58) Field of Classification Search
CPC ...................................................... G10D 3/053
USPC ............................................................ 84/318
See application file for complete search history.

(56) References Cited

U.S. PATENT DOCUMENTS 3,823,247 A * 7/1974 Bauerfeind ............ G10D 3/053 984/114
4,104,947 A * 8/1978 Oster ..................... G10D 3/053 984/114
D257,988 S * 1/1981 Nakamoto ..................... D17/20
4,334,457 A * 6/1982 Spoonts, III ........... G10D 3/053 984/114
4,671,156 A * 6/1987 Hathcock ............... G10D 3/053 984/114
5,081,894 A * 1/1992 Paige ..................... G10D 3/053 84/318
5,623,110 A * 4/1997 Hoglund ................ G10D 3/053 84/318
6,459,025 B1 * 10/2002 D'Addario ............. G10D 3/053 84/318
7,557,285 B2 * 7/2009 Ward ...................... G10D 3/053 84/422.1
9,343,045 B1 * 5/2016 Kennamore ........... G10D 3/053
9,953,622 B2 * 4/2018 Campling .............. G10D 3/053
11,646,002 B2 * 5/2023 Paige ...................... G10D 3/053 84/318
2007/0227334 A1 * 10/2007 Ward ...................... G10D 3/053 84/318

(Continued)

FOREIGN PATENT DOCUMENTS

GB 2554764 B * 10/2018 ............. G10D 3/147
KR 20010086958 A * 9/2001 ............... G10G 7/00

*Primary Examiner* — Christina M Schreiber
(74) *Attorney, Agent, or Firm* — QuickPatents; Kevin Prince

(57) ABSTRACT

A capo for stringed instruments comprises a clamping mechanism with a Y-shaped lower base and a pivotally attached top brace. The lower base has two upward-extending arms that surround the instrument neck. One arm is selectively detachable from the top brace. A fret pad on the top brace's lower side presses strings against the fretboard when engaged. The lower base may include an adjustable pressure pad controlled by a threaded shaft and knob for vertical pressure adjustment. The fret pad can feature an elastomeric lower pad with spring-loaded holders. One arm of the lower base may have downward-facing teeth, while the top brace includes a pivotable arm with an engagement pin. Installation involves positioning the capo around the neck, engaging the pivotable arm with the toothed arm, and adjusting pressure. Removal is accomplished by reversing this process.

9 Claims, 3 Drawing Sheets

(56) References Cited

U.S. PATENT DOCUMENTS

| | | | | |
|---|---|---|---|---|
| 2009/0064842 | A1* | 3/2009 | Small | G10D 3/053<br>84/318 |
| 2010/0251873 | A1* | 10/2010 | Paige | G10D 3/053<br>84/318 |
| 2015/0107437 | A1* | 4/2015 | Cannon | G10D 3/053<br>84/318 |
| 2016/0247490 | A1* | 8/2016 | Campling | G10D 3/053 |
| 2017/0032766 | A1* | 2/2017 | Blacker | G10D 3/053 |
| 2020/0066238 | A1* | 2/2020 | Paige | G10D 3/053 |
| 2021/0005171 | A1* | 1/2021 | Paige | G10D 3/053 |
| 2022/0246116 | A1* | 8/2022 | Paige | G10D 3/053 |

* cited by examiner

SPRING CUSHIONED CLAMP CAPO

CROSS REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to capos for stringed instruments, and more particularly to a capo with a Y-shaped lower base and adjustable pressure mechanism for securing around the neck and fretboard of a stringed instrument.

BACKGROUND

Capos are widely used devices in stringed instruments, particularly guitars, to effectively change the key of the instrument without retuning. They clamp across the strings on the fretboard, shortening the vibrating length of the strings and raising their pitch. Various capo designs have been developed over the years, each attempting to address specific needs of musicians.

Early capos were simple strap-on devices that wrapped around the neck of the instrument. These evolved into more sophisticated designs featuring spring-loaded clamps, screw mechanisms, and lever-operated systems. Some capos introduced adjustable pressure mechanisms to fine-tune the clamping force.

Recent innovations have focused on quick-release mechanisms and ease of use. Some designs feature mechanisms for rapid engagement and disengagement. Other designs have explored various pivotal connections and adjustment mechanisms to improve functionality.

Despite these advancements, existing capos still present certain drawbacks. Some designs can interfere with the musician's fretting hand, particularly when playing complex chords or individual notes near the capo. Additionally, the clamping mechanism of some capos can cause tuning issues by applying uneven pressure across the strings.

An ideal capo would address these limitations, offering minimal interference with playing, consistent pressure across all strings, and the ability to make fine adjustments quickly and easily. Such a capo would greatly enhance the versatility and convenience for musicians in both live performance and studio settings. The present invention accomplishes these objectives.

SUMMARY OF THE INVENTION

The present device is a capo for use with stringed instruments such as guitars. It comprises a clamping mechanism designed to secure around the neck and fretboard of the instrument. The clamping mechanism includes a Y-shaped lower base with two upwardly extending arms that surround the instrument neck. A top brace is pivotally attached to both arms of the lower base, with one arm configured to selectively detach from the top brace. A fret pad is fixed to the lower side of the top brace and presses the strings against the fretboard when engaged.

The lower base may include an adjustable pressure pad at its center, controlled by a threaded shaft and knob. This allows for vertical adjustment of pressure against the instrument neck. The pressure pad may feature an elastomeric pad for contact with the neck and a shaft that slides within a bore in the lower base.

The fret pad can include an elastomeric lower pad with multiple holders, each containing a spring to urge portions of the pad downward onto the strings. One arm of the lower base may have downward-facing teeth, while the top brace includes a pivotable arm with an engagement pin to interact with these teeth, providing a quick way to get a gross adjustment of the capo on the guitar strings.

To install the capo, the top brace is pivoted away from the lower base, positioned around the instrument neck, then pivoted back to engage the strings. The pivotable arm is engaged with the toothed arm of the lower base, and the knob is adjusted to apply the desired pressure. Removal involves reversing this process, loosening the pressure and disengaging the pivotable arm before lifting the capo off the instrument neck.

The present invention addresses the drawbacks of the prior art by providing a capo that offers significant improvements in functionality and ease of use. The capo's unique is structure minimizes interference with the fretting hand, allowing for complex chord formations and individual note playing even in close proximity to the capo. Furthermore, the invention incorporates a mechanism that ensures consistent pressure across all strings, effectively eliminating tuning issues commonly associated with uneven clamping force. The capo also features a dual-mode adjustment system, allowing for both rapid coarse adjustments and precise fine-tuning, thereby accommodating various neck sizes and string gauges with ease. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
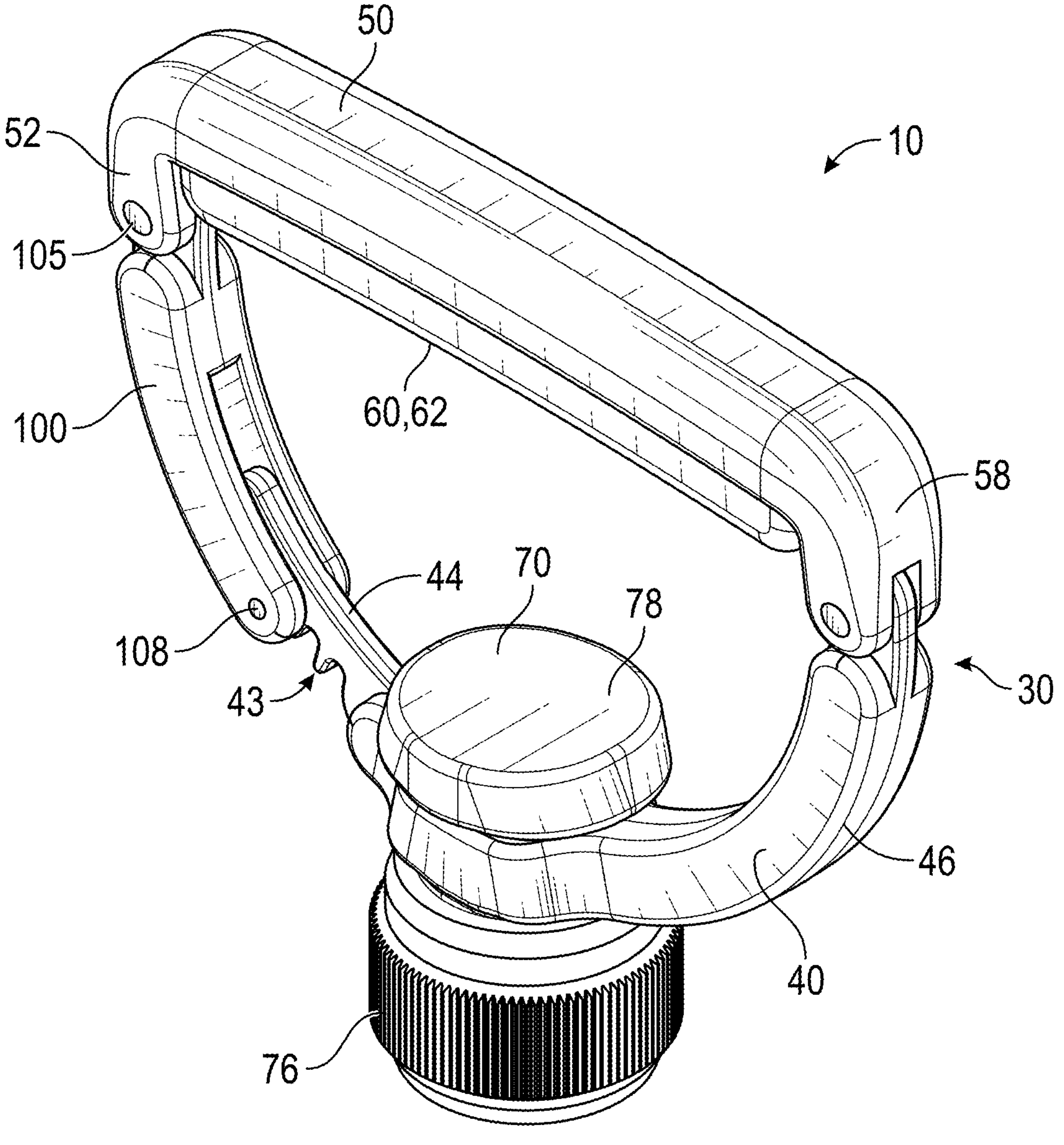
FIG. 1 is a perspective view of the invention, illustrated in a closed configuration.
Figure 2:
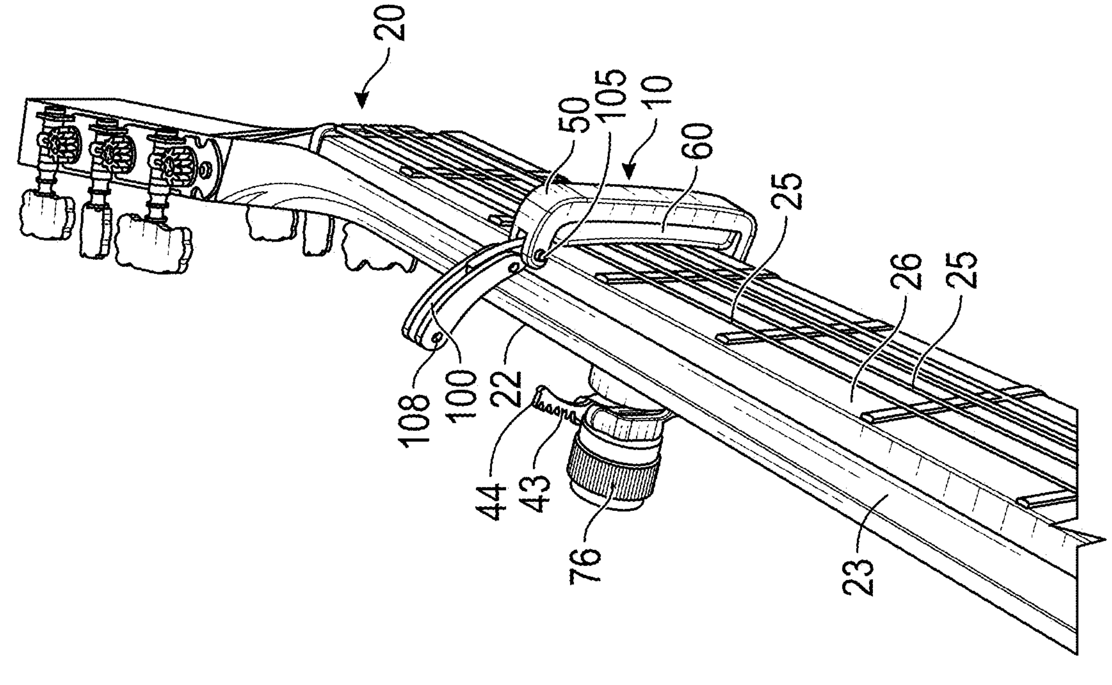
FIG. 2 is a perspective view of the invention, illustrated in an open configuration.

FIGS. 1 and 2 illustrate a capo 10 for a stringed instrument 20 having strings 25, a neck 23 with a bottom side 22, and a fret board 26. The capo 10 comprises a clamping mechanism 30 configured for securing around the neck 23 and the fret board 26 of the stringed instrument 20. Such a clamping mechanism 30 comprises a Y-shaped lower base 40 having a first arm 44 and a second arm 46 that each extend upwardly and together surround the neck 23. The Y-shaped lower base 40 may be constructed from materials such as aluminum, steel, titanium, rigid polymers, or the like.

A top brace 50 is pivotally fixed at both a first end 52 and a second end 58 with the first arm 44 and the second arm 46 of the Y-shaped lower base 40, respectively. Such a top brace 50 may be made from materials including stainless steel, hardened aluminum, reinforced composites, or the like. The first arm 44 is configured for selectively detaching from the top brace 50.

The capo 10 also includes a fret pad 60 fixed with a lower side 62 of the top brace 50 and configured for pressing the strings 25 firmly down onto the fret board 26 when the clamping mechanism 30 is engaged with the neck 23 of the stringed instrument 20. Such a fret pad 60 may be constructed from materials such as silicone rubber, neoprene, polyurethane, or the like.

The lower base 40 may include an adjustable pressure pad 70 slidably fixed at a center point thereof. Such an adjustable pressure pad 70 is fixed with a threaded shaft 75 configured to move the adjustable pressure pad 70 vertically towards or away from the neck 23 of the stringed instrument 20 and rotationally fixed with a knob 76. The threaded shaft 75 may be made from materials such as stainless steel, brass, hardened aluminum, or the like. Rotating the knob 76 moves the adjustable pressure pad 70 towards the neck 23 to press against the neck 23, thereby causing the fret pad 60 to press the strings 25 down into the fret board 26, or away from the neck 23 to release the strings 25 from the fret board 26. The knob 76 may be constructed from materials including plastic, metal, wood, or the like.

The pressure pad 70 may include an elastomeric pad 78 for contacting the neck 23 of the stringed instrument 20. Such an elastomeric pad 78 may be made from materials such as silicone rubber, neoprene, polyurethane, or the like.

The pressure pad 70 may include a shaft 74 slidably retained in a bore 45 through the Y-shaped lower base 40. Such a shaft 74 may be constructed from materials including stainless steel, hardened aluminum, brass, or the like.

Figure 4:
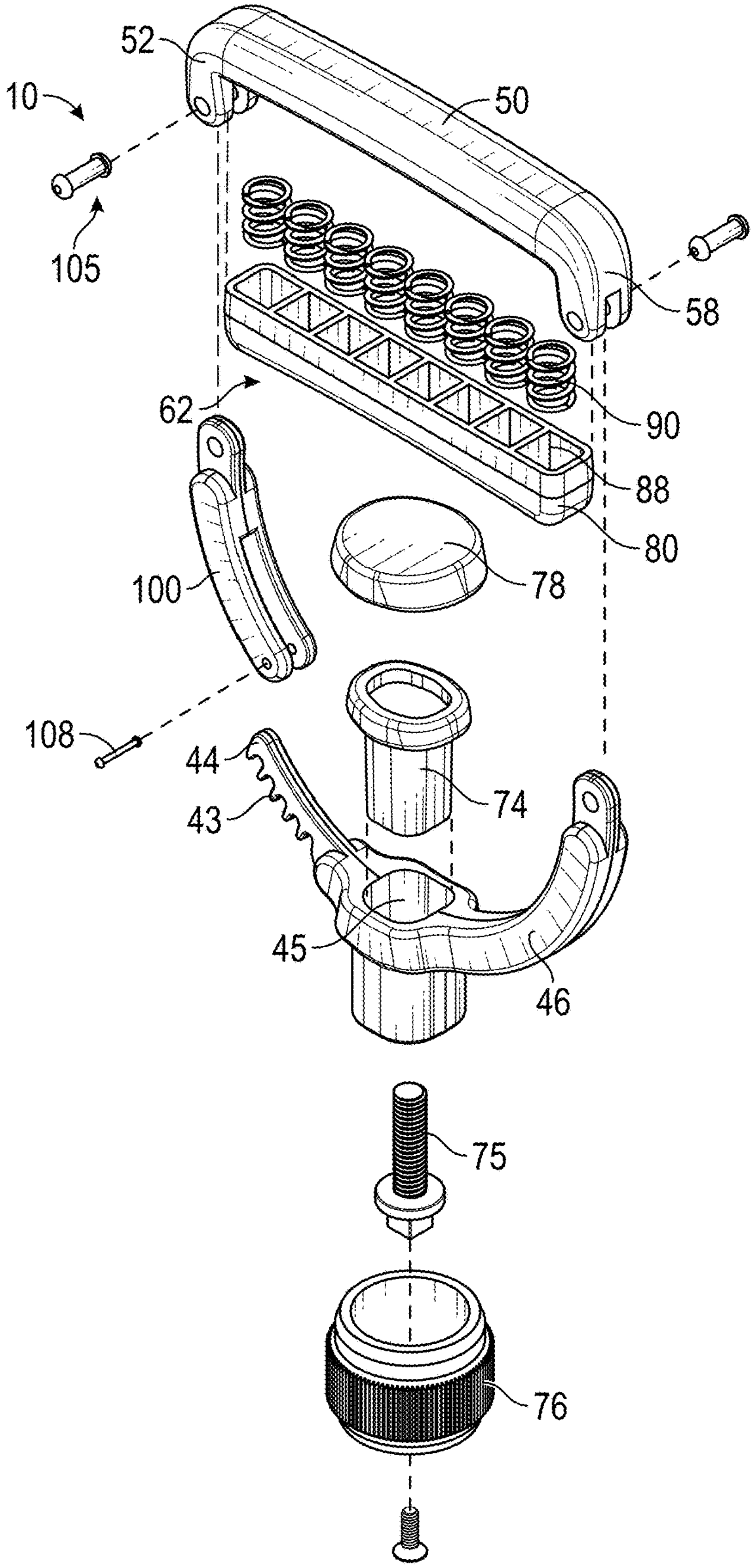
FIG. 4 is an exploded perspective view of the invention.

The fret pad 60 may include an elastomeric lower pad 80 (FIG. 4) having a plurality of holders 88 open at a top end thereof. Each holder 88 may include a spring 90 for urging that portion of the lower pad 80 downwardly into the strings 25. Such springs 90 may be made from materials such as stainless steel, phosphor bronze, nickel-plated steel, or the like.

The first arm 44 of the lower base 40 may include a plurality of downward facing teeth 43. The first end 52 of the top brace 50 may be fixed with a pivotable arm 100 fixed at a top end thereof with the first end 52 of the top brace 50 at a pivot pin 105. Such a pivotable arm 100 may have at a lower end thereof an engagement pin 108 configured to engage one of the teeth 43 of the first arm 44 of the lower base 40. This allows for quick gross adjustment of the capo 10 onto the fret board 26. The pivot pin 105 and engagement pin 108 may be constructed from materials including hardened steel, titanium, ceramic, or the like.

Figure 3:
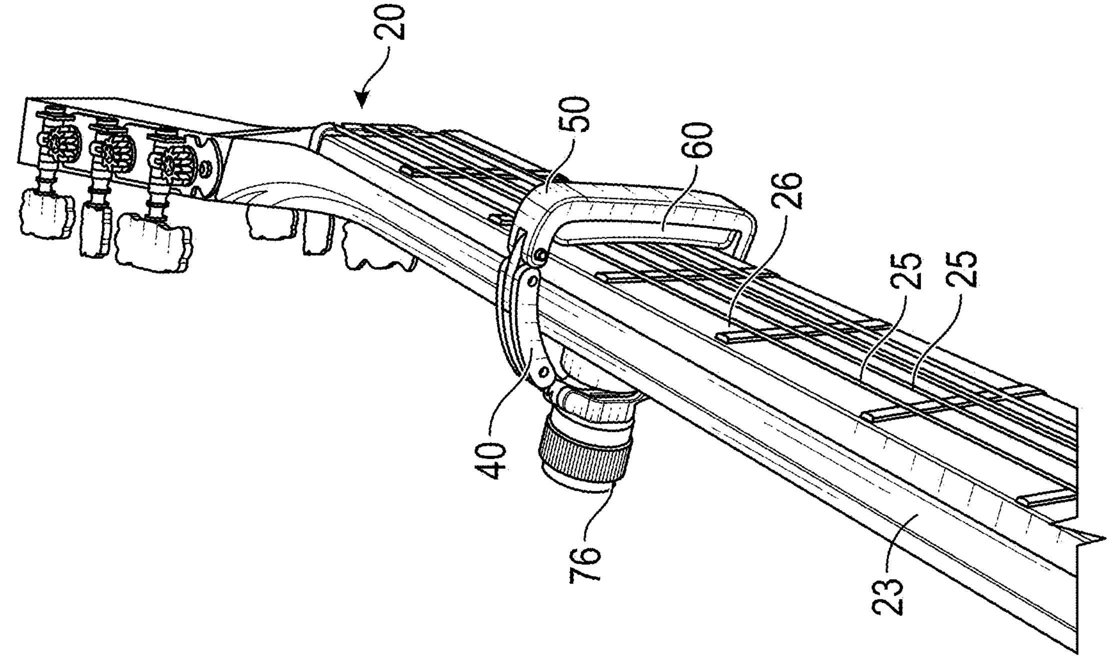
FIG. 3 is a perspective view of the invention, illustrated in a closed configuration around a neck of a stringed instrument.

To install the capo 10 on the stringed instrument 20, the top brace 50 is pivoted away from the lower base 40 to allow the lower base 40 to be positioned around the neck 23 of the stringed instrument 20 (FIG. 3). The top brace 50 is then pivoted back towards the fret board 26 with the pivotable arm 100 extending down to engage one of the teeth 43 of the first arm 44 of the lower base 40. The top brace 50 is pressed towards the fret board 26 to compress the fret pad 60 and allow the engagement pin 108 of the pivot arm 100 to become positioned proximate one of the teeth 43 of the first arm 44 of the lower base 40. The top brace 50 is then released to allow the engagement pin 108 of the pivot arm 100 to engage one of the teeth 43 of the first arm 44 of the lower base 40. The knob 76 is then rotated to tighten the fret pad 60 against the strings 25 and the fret board 26.

To remove the capo 10, the process is reversed. The knob 76 is rotated to loosen the pressure on the strings 25. The top brace 50 is then pressed towards the fret board 26 to disengage the engagement pin 108 from the teeth 43. The pivotable arm 100 can then be is swung away from the first arm 44, allowing the top brace 50 to be pivoted away from the lower base 40. The capo 10 can then be lifted off the neck 23 of the stringed instrument 20.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the is inventor contemplates the various aspects of the invention in any number of claim forms. Accordingly, the inventor reserves the right to add additional claims after filing the application to pursue such additional claim forms for other aspects of the invention.

What is claimed is:

1. A capo for a stringed instrument having strings, a neck with a bottom side, and a fret board, the capo comprising:

a clamping mechanism configured for securing around the neck and the fret board of the stringed instrument, the clamping mechanism comprising a Y-shaped lower base having a first arm and a second arm that each extend upwardly and together surround the neck, the first arm including a plurality of downward facing teeth, a top brace pivotally fixed at both a first end and a second end with the first arm and the second arm of the Y-shaped lower base, respectively, the first arm configured for selectively detaching from the top brace;

a pivotable arm fixed at a top end thereof with the first end of the top brace at a pivot pin, and having at a lower end thereof an engagement pin configured to engage one of the teeth of the first arm of the lower base; and a fret pad fixed with a lower side of the top brace and configured for pressing the strings firmly down onto the fret board when the clamping mechanism is engaged with the neck of the stringed instrument.

2. The capo of claim 1 wherein the lower base includes an adjustable pressure pad slidably fixed at a center point thereof, the adjustable pressure pad fixed with a threaded shaft configured to move the adjustable pressure pad vertically towards or away from the neck of the stringed instrument and rotationally fixed with a knob.

3. The capo of claim 2 wherein the pressure pad includes an elastomeric pad for contacting the neck of the stringed instrument.

4. The capo of claim 2 wherein the pressure pad includes a sliding shaft slidably retained in a bore through the Y-shaped lower base.

5. The capo of claim 1 wherein the fret pad includes an elastomeric lower pad having a plurality of holders open at a top end thereof, each holder including a spring for urging a respective portion of the lower pad downwardly into the strings.

6. A capo for a stringed instrument having strings, a neck with a bottom side, and a fret board, the capo comprising:

a clamping mechanism configured for securing around the neck and the fret board of the stringed instrument, the clamping mechanism comprising a Y-shaped lower base having a first arm and a second arm that each extend upwardly and together surround the neck, a top brace pivotally fixed at both a first end and a second end with the first arm and the second arm of the Y-shaped lower base, respectively, the first arm configured for selectively detaching from the top brace;

an adjustable pressure pad slidably fixed at a center point of the lower base, the adjustable pressure pad fixed with a threaded shaft configured to move the adjustable pressure pad vertically towards or away from the neck of the stringed instrument and rotationally fixed with a knob; and a fret pad fixed with a lower side of the top brace and configured for pressing the strings firmly down onto the fret board when the clamping mechanism is engaged with the neck of the stringed instrument;

the first arm of the lower base including a plurality of downward facing teeth, and wherein the first end of the top brace is fixed with a pivotable arm fixed at a top end thereof with the first end of the top brace at a pivot pin, and having at a lower end thereof an engagement pin configured to engage one of the teeth of the first arm of the lower base.

7. The capo of claim 6 wherein the fret pad includes an elastomeric lower pad having a plurality of holders open at a top end thereof, each holder including a spring for urging a respective portion of the lower pad downwardly into the strings.

8. The capo of claim 6 wherein the pressure pad includes an elastomeric pad for contacting the neck of the stringed instrument.

9. The capo of claim 6 wherein the pressure pad includes a sliding shaft slidably retained in a bore through the Y-shaped lower base.

* * * * *